(12) United States Patent
Hayashida et al.

(10) Patent No.: US 6,385,815 B1
(45) Date of Patent: May 14, 2002

(54) FRICTIONAL HINGE DEVICE

(75) Inventors: Takaaki Hayashida; Masato Uneme, both of Nagoya (JP)

(73) Assignee: Chuo Hatsujo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/459,857

(22) Filed: Dec. 14, 1999

(30) Foreign Application Priority Data

Apr. 22, 1999  (JP) .............................................. 11-114325

(51) Int. Cl.⁷ .............................................. E05D 11/10
(52) U.S. Cl. .............................. 16/342; 16/385; 16/386; 361/683
(58) Field of Search ........................ 16/342, 385, 386; 361/679, 683

(56) References Cited

U.S. PATENT DOCUMENTS

| | | | |
|---|---|---|---|
| 4,412,711 A | * | 11/1983 | Suska |
| 4,419,788 A | * | 12/1983 | Prout |
| 4,787,121 A | * | 11/1988 | Racenis et al. |
| 4,809,402 A | * | 3/1989 | Rainville |
| 5,548,478 A | * | 8/1996 | Kumar et al. |
| 5,704,094 A | * | 1/1998 | Hartigan et al. |
| 5,809,617 A | * | 9/1998 | Harris et al. |

FOREIGN PATENT DOCUMENTS

JP          5-154864          6/1993

OTHER PUBLICATIONS

English translation of Laid–open Japanese Patent Application No. 5–154864.*
MRC Polymers, MRC Polymers' Technical Group–Fall 2000, What Should You Know About Polyacetal Resins?.*
* cited by examiner Primary Examiner—Lynne H. Browne
Assistant Examiner—Tomlyne A Malcolm
(74) Attorney, Agent, or Firm—Morgan, Lewis & Bockius LLP

(57) ABSTRACT

In a frictional hinge device a support block 20 is molded in a synthetic resin around the metallic shaft 10 so that the support block 20 is rotatably supported by the metallic shaft 10. The support block 20 is held at any angles by a surface friction resistance between the support block 20 and the metallic shaft 10. The synthetic resin has a modulus of bending elasticity, a changing rate of which is up to 30% at an operating temperature ranging from −20 to 80° C. The support block 20 tightly engages with the metallic shaft 10 due to a residual stress appeared between the support block 20 and the metallic shaft 10 when cooling the synthetic resin to shrink. Due to the smaller changing rate of the modulus of bending elasticity, the surface friction resistance becomes stable between the support block 20 and the metallic shaft 10 under normal ambient temperature with the least amount of friction.

11 Claims, 14 Drawing Sheets

FRICTIONAL HINGE DEVICE

BACKGROUND OF THE INVENTION

1. Field of the Invention

The invention relates to a frictional hinge device which is used to pivotably support a lid and display of a portable business such as a laptop note type personal computer, and particularly concerns to a frictional hinge device used to frictionally hold the lid and display at desired pivotal angles.

2. Description of Prior Art

This type of the frictional hinge device is disclosed by Laid-open Japanese Patent Application No. 5-154864. This teaches that an outer shaft is made of a synthetic resin and integrally molded with an inner shaft. Due to a surface frictional resistance between the inner and outer shafts, it is possible to frictionally hold the inner shaft at the desired pivotal angle while permitting the inner shaft to rotate relative to the outer shaft against the force of the surface frictional resistance therebetween.

However, the disclosure remains silent about qualitative and quantitative analyses on the relationship between the inner and outer shafts. This causes no smaller variations on torque when the inner shaft pivotally moves. This also causes abnormal noise due to a stickslip phenomenon when pivotally moving the inner shaft while losing a good endurance with a torque reduced due to an unacceptable amount of wear between the inner and outer shafts.

Therefore, the present invention has been made with the above drawbacks in mind, it is a main object of the invention to provide a frictional hinge device which is capable of maintaining a stable frictional resistance between a shaft member and a support member for an extended period of time when frictionally holding the shaft member at desired pivotal angles based on the frictional surface resistance.

SUMMARY OF THE INVENTION

With a support member made of a resin molded to surround a shaft member, the support member tightly engages with the shaft member due to a residual stress established by a shrinkage allowance after molding the support member in integral with the shaft member. During the molding process, the synthetic resin is injected into a die mold in which the shaft member was beforehand placed.

When a surface frictional resistance appeared between the support member and the shaft member is smaller than an exterior torque to which the shaft member is subjected, the shaft member pivotally moves relative to the support member. When the surface frictional resistance exceeds the exterior torque, the shaft member is held at a desired pivotal angle due to the surface frictional resistance.

With the support member and the shaft member molded integrally, it is possible to manufacture them less costly while making it possible to readily determine the surface frictional resistance necessary to suspend the shaft member at the desired pivotal position.

With a changing rate of a bending elasticity up to 30% at an operating temperature ranging from −20 to 80° C., it is possible to maintain at least 20% of the total friction against the shaft member when the normal ambient temperature fluctuates.

With the synthetic resin mixed with an organic or inorganic antifriction medium, it is possible to ensure a smooth pivotal movement with the shaft member. As opposed to the case in which greasing agent is applied between the support member and the shaft member, it is possible to prevent the perimeter from being polluted. It is also possible to exceedingly reduce the wear dust produced between the support member and the shaft member to maintain a stable surface frictional resistance therebetween for an extended period of time.

By mixing the synthetic resin with fiber to improve its mechanical strength, it is possible to ameliorate the endurance.

With the frictional hinge device used to pivotably move a display for a portable business device, it is possible to suspend the display at desired angles to ensure a good position for visually recognizing what the display shows.

BRIEF DESCRIPTION OF THE DRAWINGS

A preferred form of the present invention is illustrated in the accompanying drawings in which.

DETAILED DESCRIPTION OF THE PREFERRED EMBODIMENTS

Figure 1:
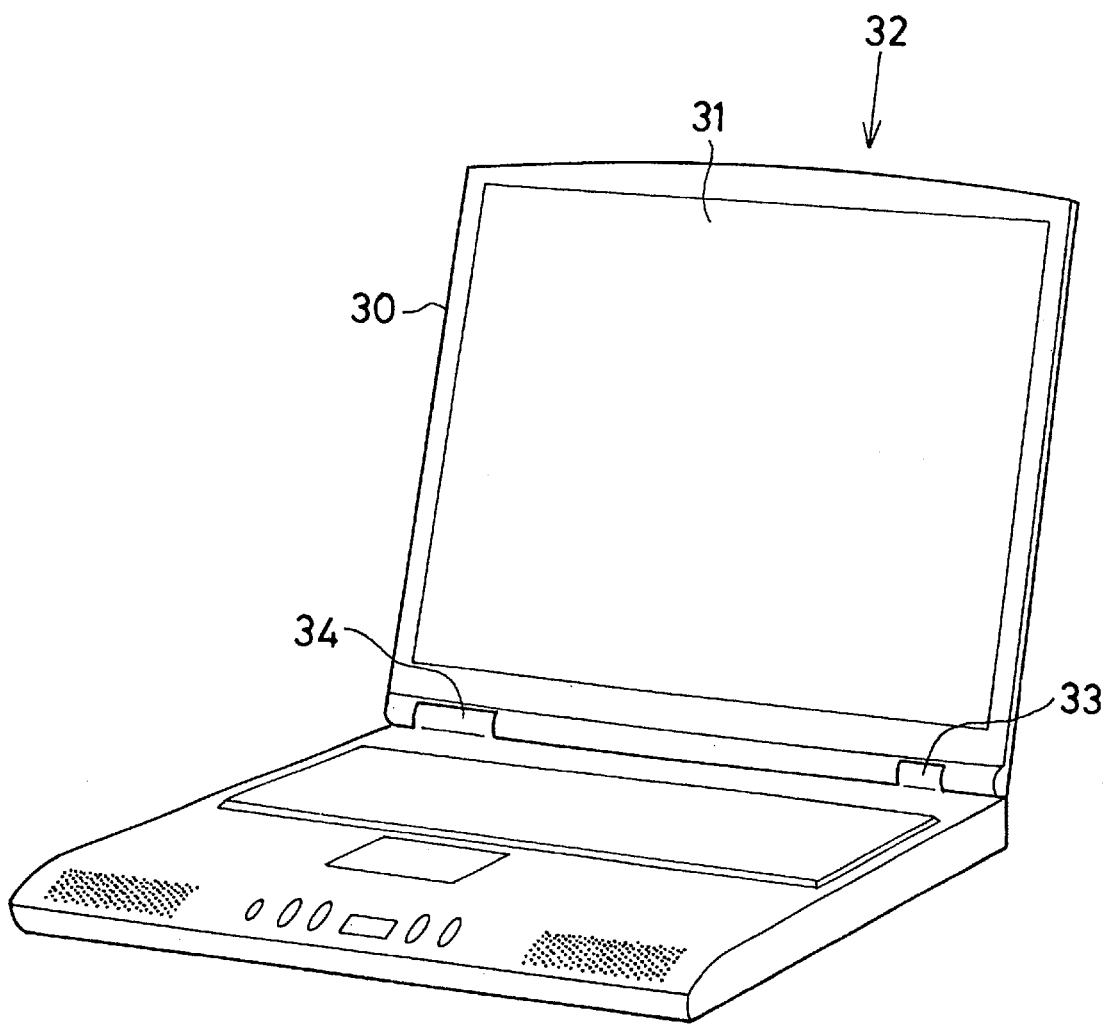
FIG. 1 is a perspective view of a laptop note type personal computer into which a frictional hinge device is incorporated according to a first embodiment of the invention.

Referring to FIGS. 1 through 12 which depict about a frictional hinge device 1 according to a first embodiment of the invention. The frictional hinge device 1 is used at lower ends 33, 34 to pivotally move a lid plate 30 for a liquid crystal display 31 in a laptop note type personal computer 32 (portable business device) as shown in FIG. 1. The lid plate 30 is adjusted at its pivotal angle to secure a good position so as to visually recognize information in the liquid crystal display 31.

Figure 1A:
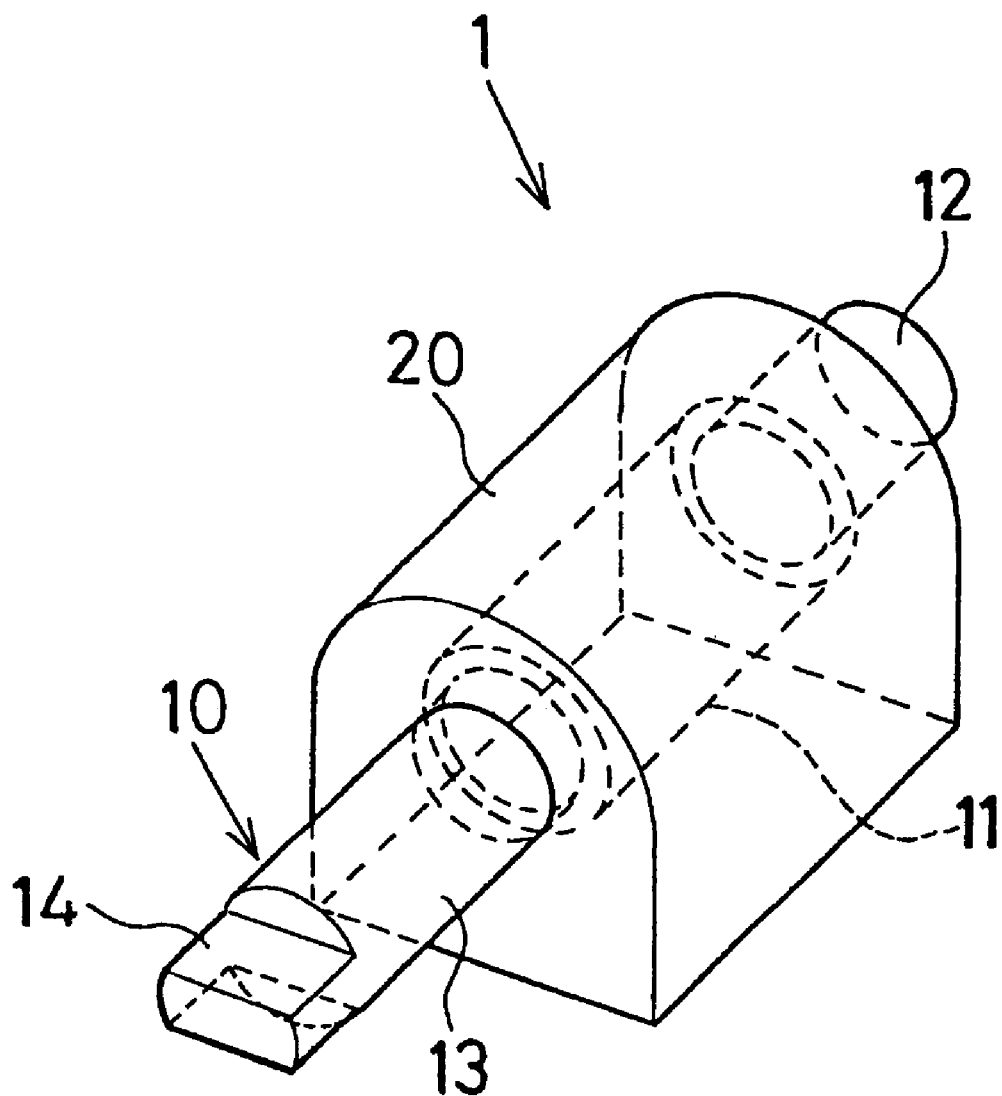
FIG. 1a is a perspective view of the frictional hinge device.

As shown in FIG. 1a, the frictional hinge device 1 has a metallic shaft 10 which serves as a rotational axis of a rotational center. The metallic shaft 10 is secured to the lid plate 30 of the personal computer 32 to pivotally move in unison with the lid plate 30. A support block 20 is provided to pivotably support the metallic shaft 10.

Figure 2:
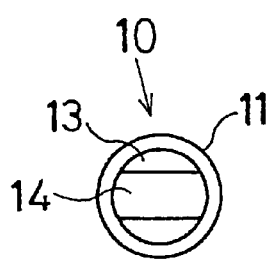
FIG. 2 is a plan view of a shaft member of the frictional hinge device.
Figure 3:
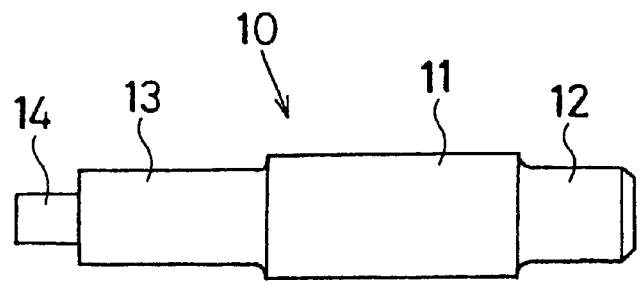
FIG. 3 is a side elevational view of the shaft member of the frictional hinge device.

As depicted in FIGS. 2, 3, the metallic shaft 10 is made of steel or stainless steel (SUS) to form a bar-shaped configuration. The metallic shaft 10 has a diameter-increased section 11 (e.g., 5 mm in diameter) in middle portion and diameter-reduced sections 12, 13 (e.g., 4 mm in diameter) in right and left end sides. The left ended diameter-reduced section 13 has a dowel 14 to connectedly interfit into the lid plate 30.

Figure 4:
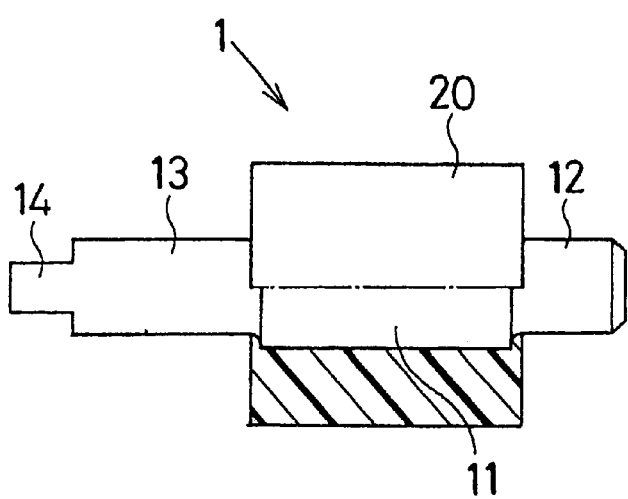
FIG. 4 is a side elevational view of the frictional hinge device.
Figure 5:
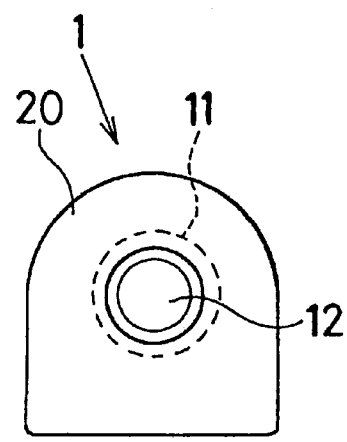
FIG. 5 is a plan view of the frictional hinge device.

As shown in FIGS. 4, 5, the support block 20 is formed by a synthetic resin which tightly engages with an outer surface of the diameter-increased section 11 of the outer surface of the diameter-increased section 11 of the metallic shaft 10. In this instance, the synthetic resin powder is injected into a die mold (heated to about 140° C.) in which the metallic shaft 10 was beforehand placed. When molding the synthetic resin (support block 20) around metallic shaft 10, residual stress appeared between the support block 20 and the metallic shaft 10 when cooling the synthetic resin to shrink. The residual stress thus appeared works as a surface friction resistance between the support block 20 and the metallic shaft 10 to hold the support block 20 at any angles.

The frictional hinge device 1 holds the lid plate 30 at any angle against a main body of the personal computer 32. For this reason, it is necessary to adjust a relative torque of the metallic shaft 10 against the support block 20 when the torque is less than a predetermined value. While it is necessary to provide a smooth pivotal movement with the metallic shaft 10 when the torque is greater than the predetermined value.

In more tangible terms, it is required for the metallic shaft 10 to ensure a stable torque of about 1~20 kgf·cm while it is necessary to secure about 50000 times of open and closure operation as an endurable time limit when an open and closure operation of the lid plate 30 is counted. When 50000 times of the open and closure operation is counted, it is requisite that a torque holding rate must be 80% or more of an initial torque which is exhibited at the first open and closure operation of the lid plate 30.

Figure 6:
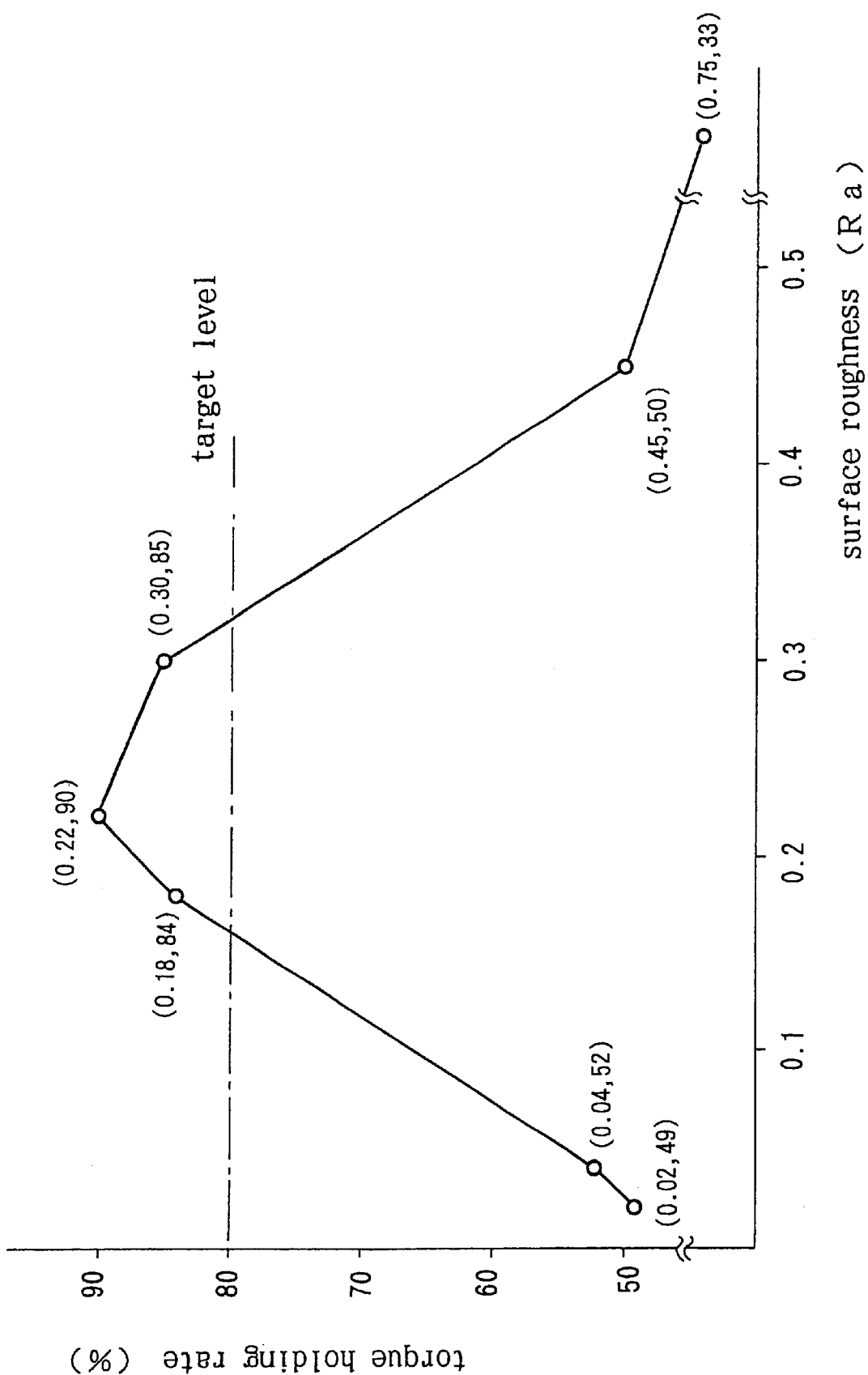
FIG. 6 is a characteristics showing a relationship between a surface roughness and a torque holding rate represented after operating the frictional hinge device by predetermined times in order to describe an efficiency.

In order to satisfy the above requirements, researches have been carried out to seek an optimum surface roughness (Ra) at the outer surface of the diameter-increased section 11 of the metallic shaft 10. As shown in FIG. 6, it is necessary to ensure the surface roughness (Ra) of not 0.02~0.14 μm but 0.15~0.35 μm in order to obtain the torque holding rate of 80% or more of the initial torque when any desired times of operation is counted. When the surface roughness (Ra) is minute, it was found that variations of the torque increases while inducing a creaking noise due to the stickslip during the open and closure operation.

When the surface roughness (Ra) exceeds 0.7 μm or more, the metallic shaft 10 thickly scratches against the support block 20 with the increased stickslip. This increases the wear of the support block 20 enough to lose the residual stress due to the shrinkage allowance when about 1000 times of the open and closure operation is counted. It was found that the torque holding rate remarkably reduces when the surface roughness (Ra) exceeds 0.2 μm.

With the above experimental test results in mind, the optimum surface roughness (Ra) is represented by 0.15~0.35 μm at the outer surface of the diameter-increased section 11 of the metallic shaft 10.

Upon making the metallic shaft 10 from a metallic bar whose surface roughness (Ra) is 3.2 μm or less, the metallic bar is treated with Ni—P plating (5~15 μm in thickness) or hardened Cr plating (5.0~15 μm in thickness), and polished with a buff to provide an antirust measure and good durability. This treatment provides the surface roughness (Ra) of 0.15~0.35 μm with the outer surface of the diameter-increased section 11 of the metallic shaft 10.

Figure 7:
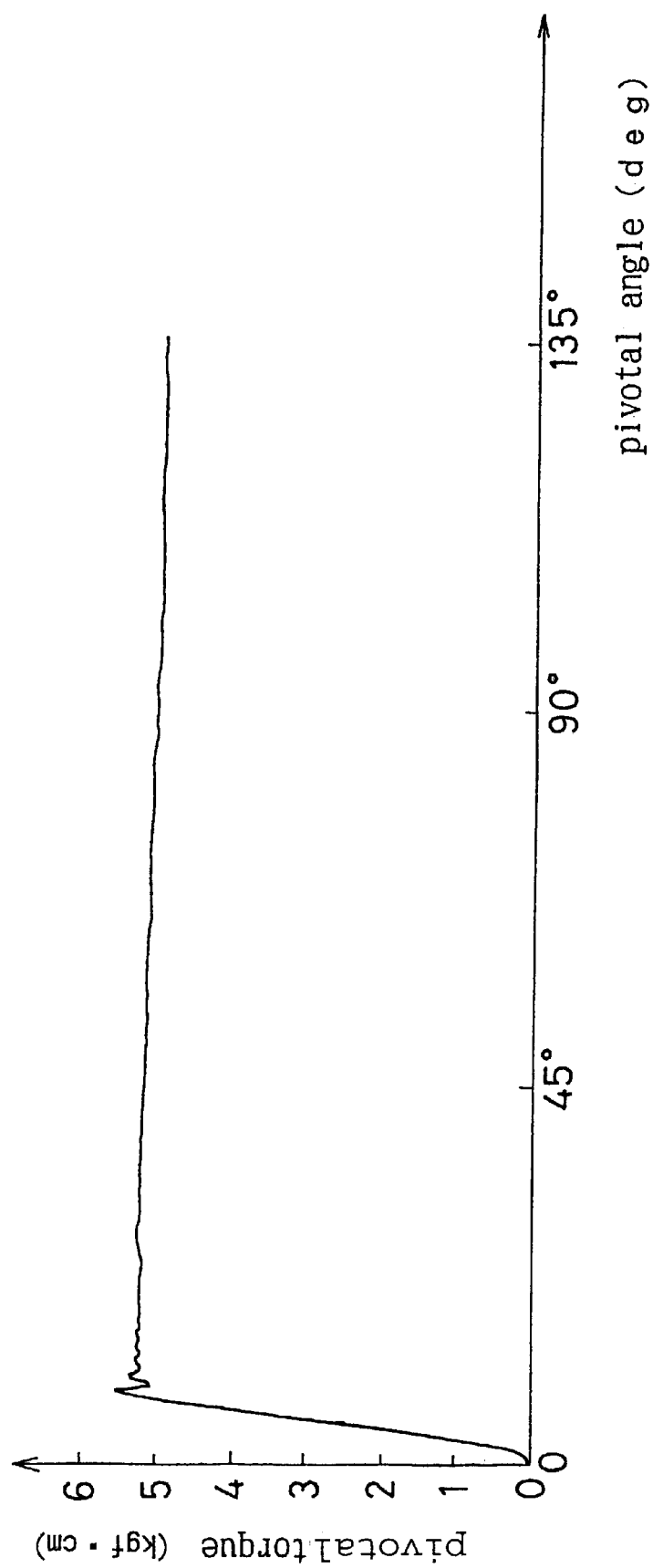
FIG. 7 is a characteristics showing a relationship between a pivotal angle and torque when providing an optimum surface roughness with the shaft member.
Figure 8:
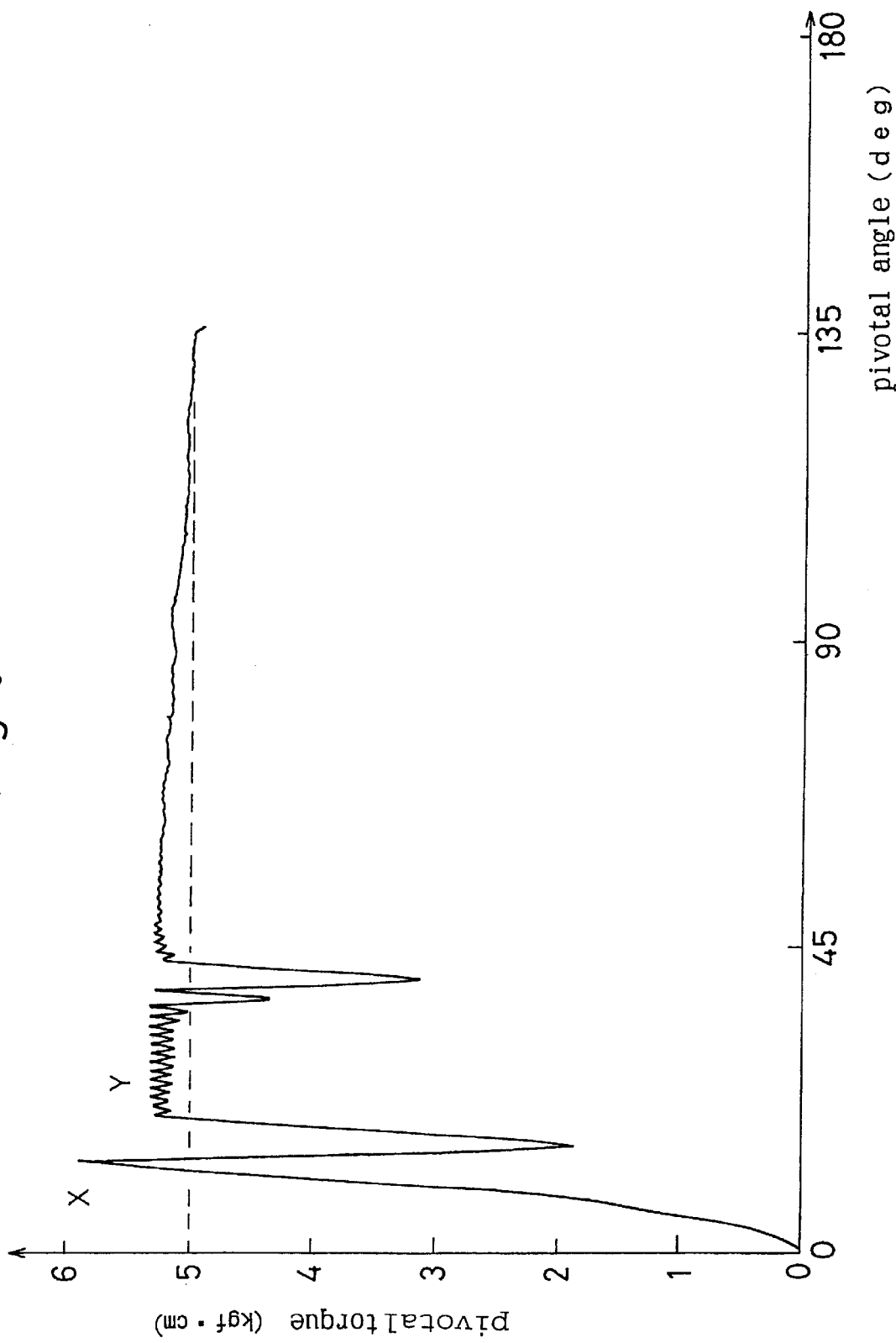
FIG. 8 is a characteristics showing a relationship between the pivotal angle and torque when providing a greater surface roughness with the shaft member.

As a synthetic resin used to the support block 20, PAR (polyarylate) is selected herein. FIG. 7 shows a relationship between a pivotal angle and torque during the process in which the metallic shaft 10 pivotally moves to open and close the lid plate 30 with the surface roughness (Ra) at 0.18 μm. FIG. 8 shows a relationship between the pivotal angle and torque with the surface roughness (Ra) at 0.75 μm for the purpose of comparison.

When the surface roughness (Ra) is 0.75 μm, the metallic shaft 10 thickly scratches against the support block 20 with a greater stickslip as denoted at X, Y in FIG. 8 when the metallic shaft 10 begins to pivotally move. When the surface roughness (Ra) is 0.18 μm, it was found that the scratch and stickslip are inappreciably slight as shown in FIG. 7.

Figure 9:
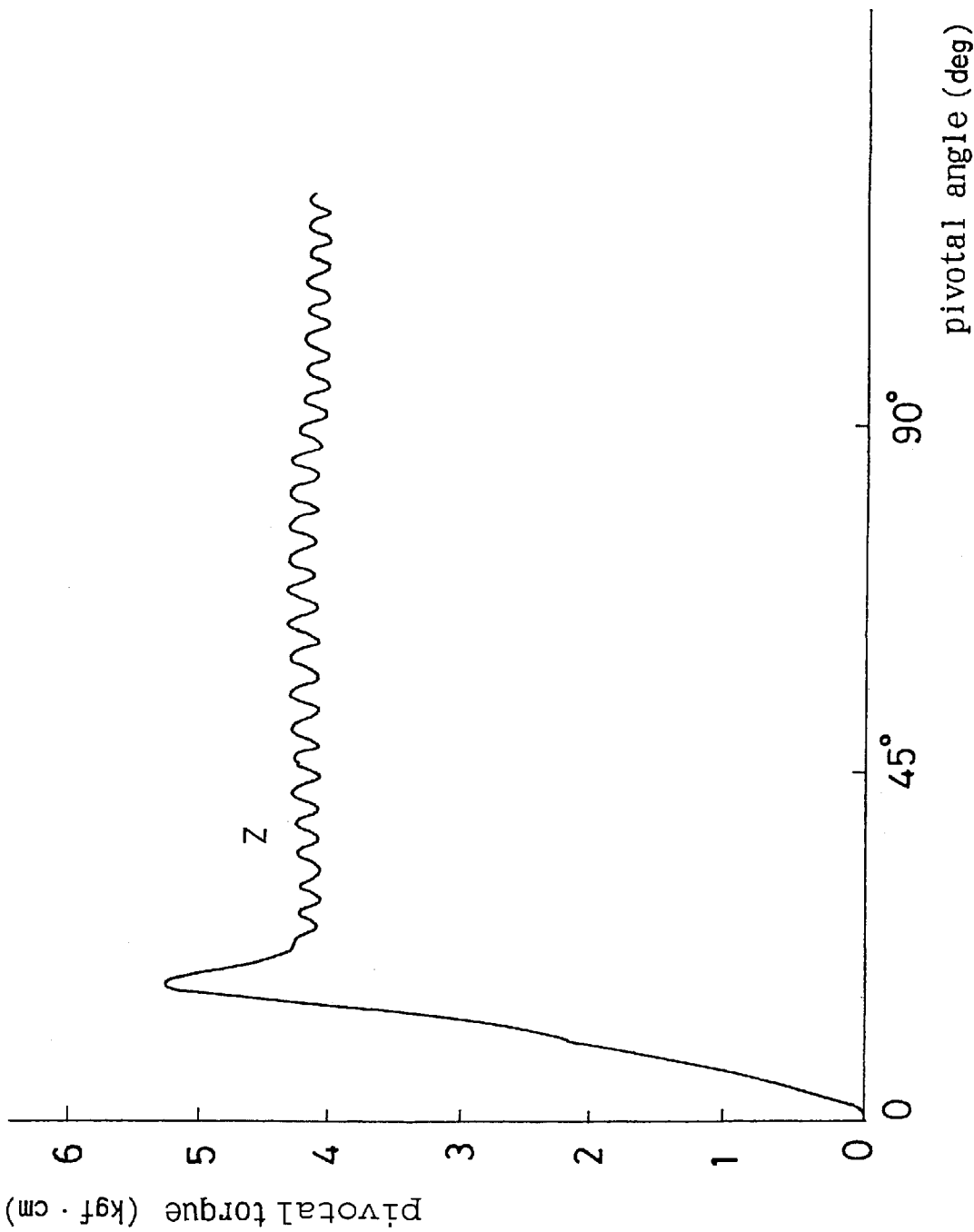
FIG. 9 is a characteristics showing a relationship between the pivotal angle and torque when providing a smaller surface roughness with the shaft member.

When the surface roughness (Ra) reduces to 0.02 μm, 0.04 μm, it was found that the stickslip increases as shown by Z in FIG. 9.

Table 1 lists up the pivotal torque, stickslip and scratch against variety of the surface roughnesses.

TABLE 1

| surface roughness (Ra) | pivotal torque on average (kgf · cm) | stickslip (kgf · cm) | scratch (kgf · cm) |
|---|---|---|---|
| ① 0.75 μm | 4.9 | 0.2 | 3.0 |
|  | 5.2 | 0.2 | 4.0 |
| ② 0.18 μm | 4.9 | ≦0.1 | 0.4 |
|  | 5.1 |  | 1.4 |
| ③ 0.02 μm 0.04 μm | 4.8 | 0.2~0.3 | 1.0 |

Note:
The metallic shaft (4 mm in dia.) treated with Ni-P plating.
The support block made of PAR (polyarylate).
① represents a greater surface roughness.
② represents the present invention.
③ represents a smaller surface roughness.

In order to attain a stable frictional resistance with the metallic shaft 10, the synthetic resin used to the support block 20 has a smaller changing rate of a bending elasticity (GPa) under an operating temperature ranging from e.g., −20 to 80° C.

Figure 10:
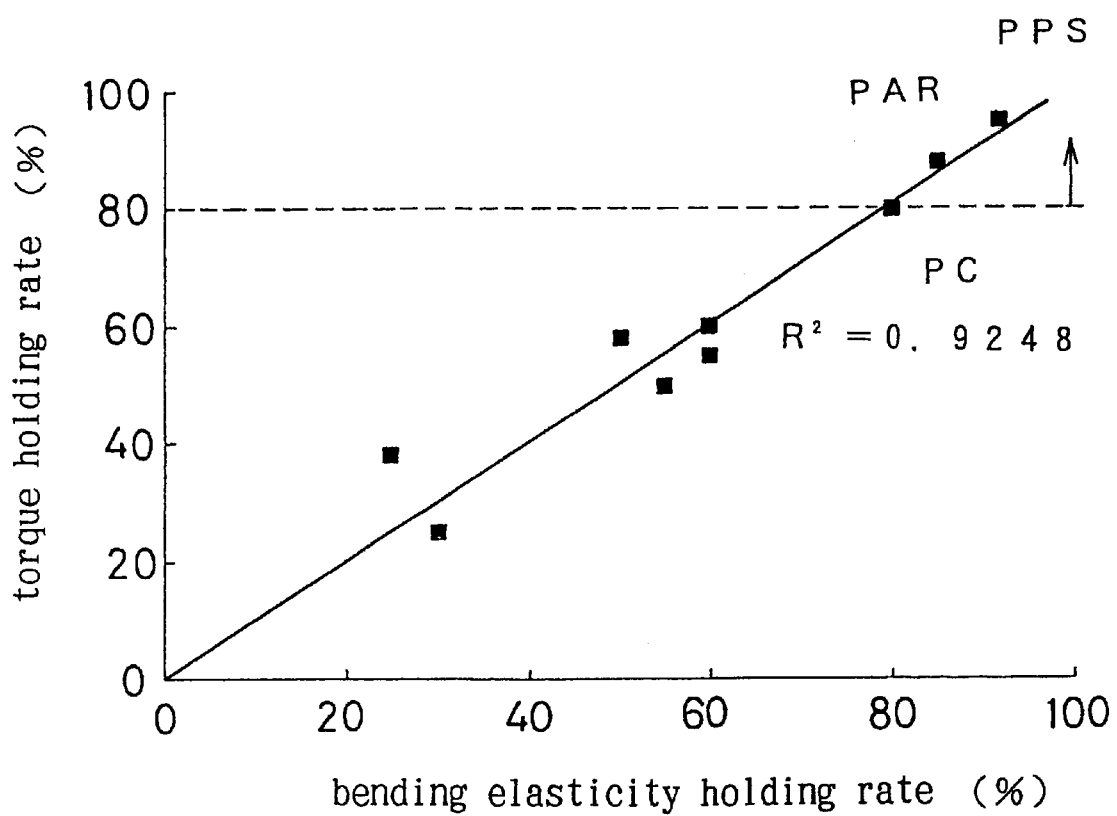
FIG. 10 is a characteristics showing a relationship between a bending elasticity holding rate and torque holding rate on a variety of synthetic resins.

This is based on a survey in FIG. 10 which represents a relationship between a torque holding rate and bending elasticity holding rate in which the torque holding rate of 80% or more corresponds to the bending elasticity holding rate of 80% or more. By using the synthetic resin having a higher bending elasticity holding rate (i.e., smaller changing rate of the bending elasticity under the predetermined operating temperature range), it is possible to achieve a higher torque holding rate.

In this instance, the torque holding rate is expressed as follows:

Torque holding rate (%)=(torque deteriorated due to heat or endurable limit)×100/(initial torque)

Figure 11:
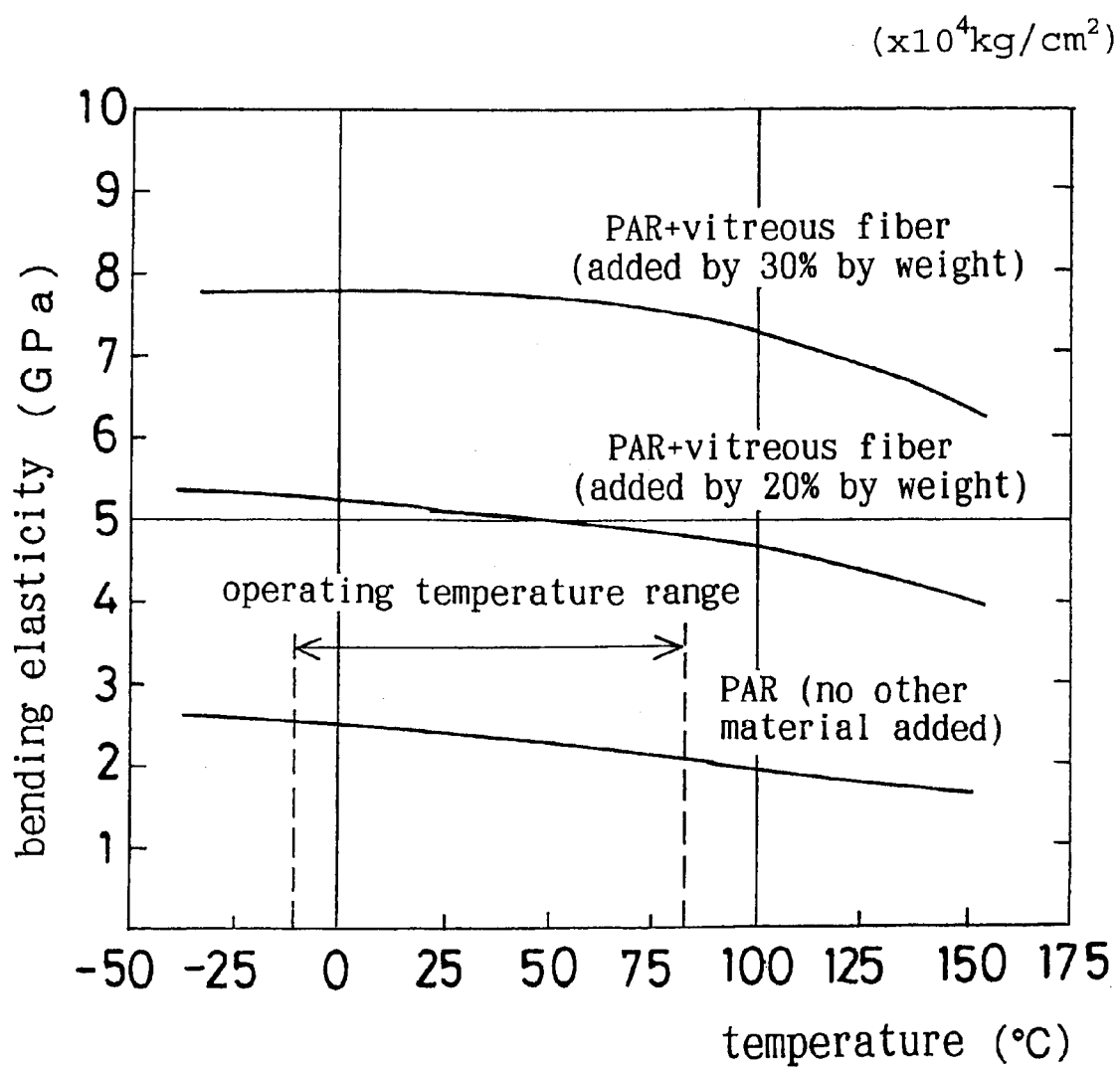
FIG. 11 is a characteristics showing a relationship between a bending elasticity and temperature on the synthetic resins in which a changing rate of the bending elasticity is relatively small.
Figure 12:
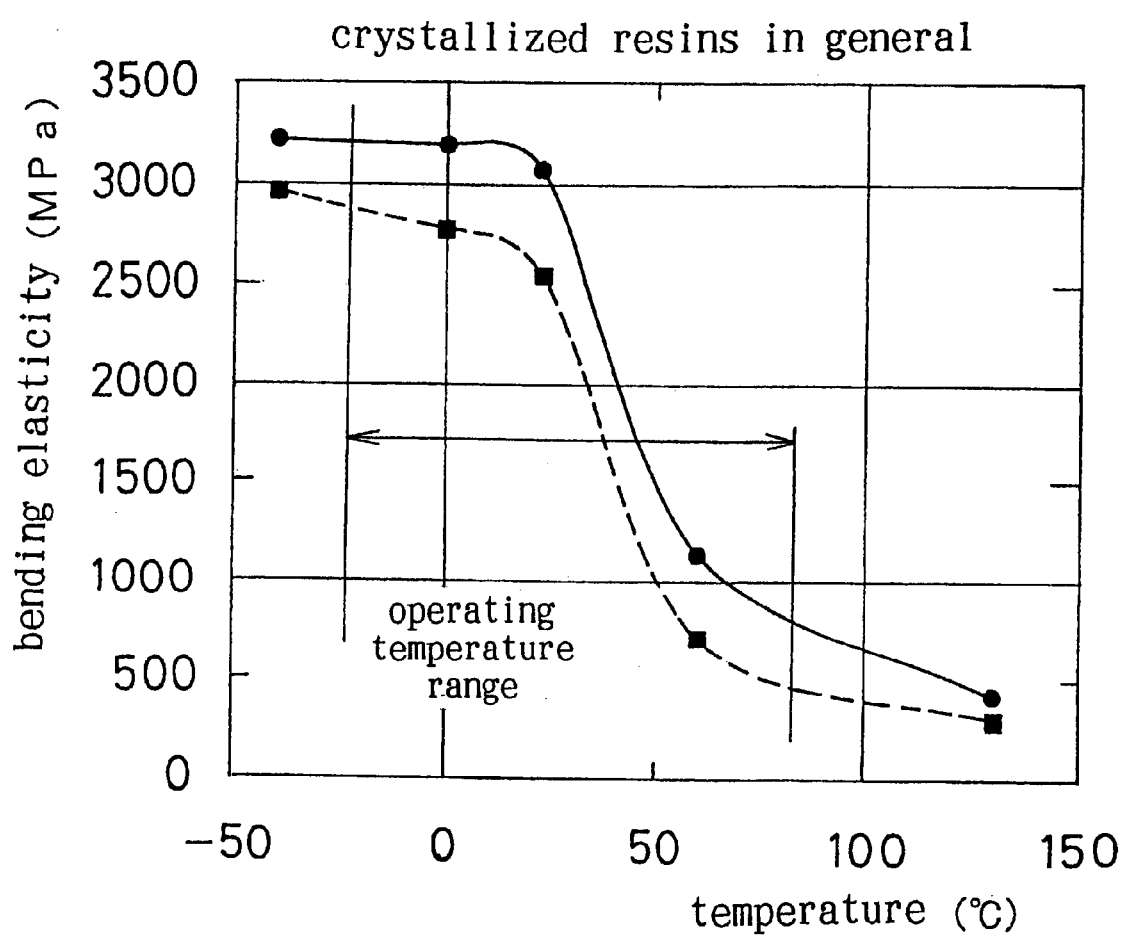
FIG. 12 is a characteristics showing a relationship between the bending elasticity and temperature on crystallized resins in general for the purpose of comparing with FIG. 11.

FIGS. 11, 12 show a relationship between the bending elasticity holding rate and the ambient temperature. As depicted in FIG. 11, PAR is suited to the synthetic resin for the support block 20 from the reason that the bending elasticity does not change significantly under the ambient temperature in which the personal computer 32 is placed. In the crystallized resins usually used in general, the bending elasticity changes greatly under the operating temperature as shown in FIG. 12. These crystallized resins are not suited for the support block 20 because they can not afford enough surface friction against the metallic shaft 10.

With this in mind, an amorphous resin is selected as below which loses less physical properties when crystallized.

The amorphous resin represents PS (polystyrene), PMMA (polymetyl methacrylate), PPE (polyphenylene ether), PC (polycarbonate), PAR (polyarylate), PAI (polyamide imide), PES (polyether sulfone), PSF (polysulfone) and PEI (polyether imide).

Crystallized resin which loses less physical properties when crystallized is selected from PPS (polyphenylene sulphide), PEEK (polyether ether ketone), aromatic PA (aromatic polyamide), PMP (polymetylpentene) and PEK (polyether ketone).

As a second embodiment of the invention, added to the above amorphous resin is an organic based antifriction medium (within 15% by weight) such as fluoro-based resin, olefine-based resin, whale oil, carbon fiber, graphite or the like. Instead of the organic based antifriction medium, an inorganic based antifriction medium (within 15% by weight) can be selected from molybdate bisulfide, antimonate oxide, potassium titanate, talc, vitreous particulate, metallic soap, kaolin clay or the like.

Figure 13:
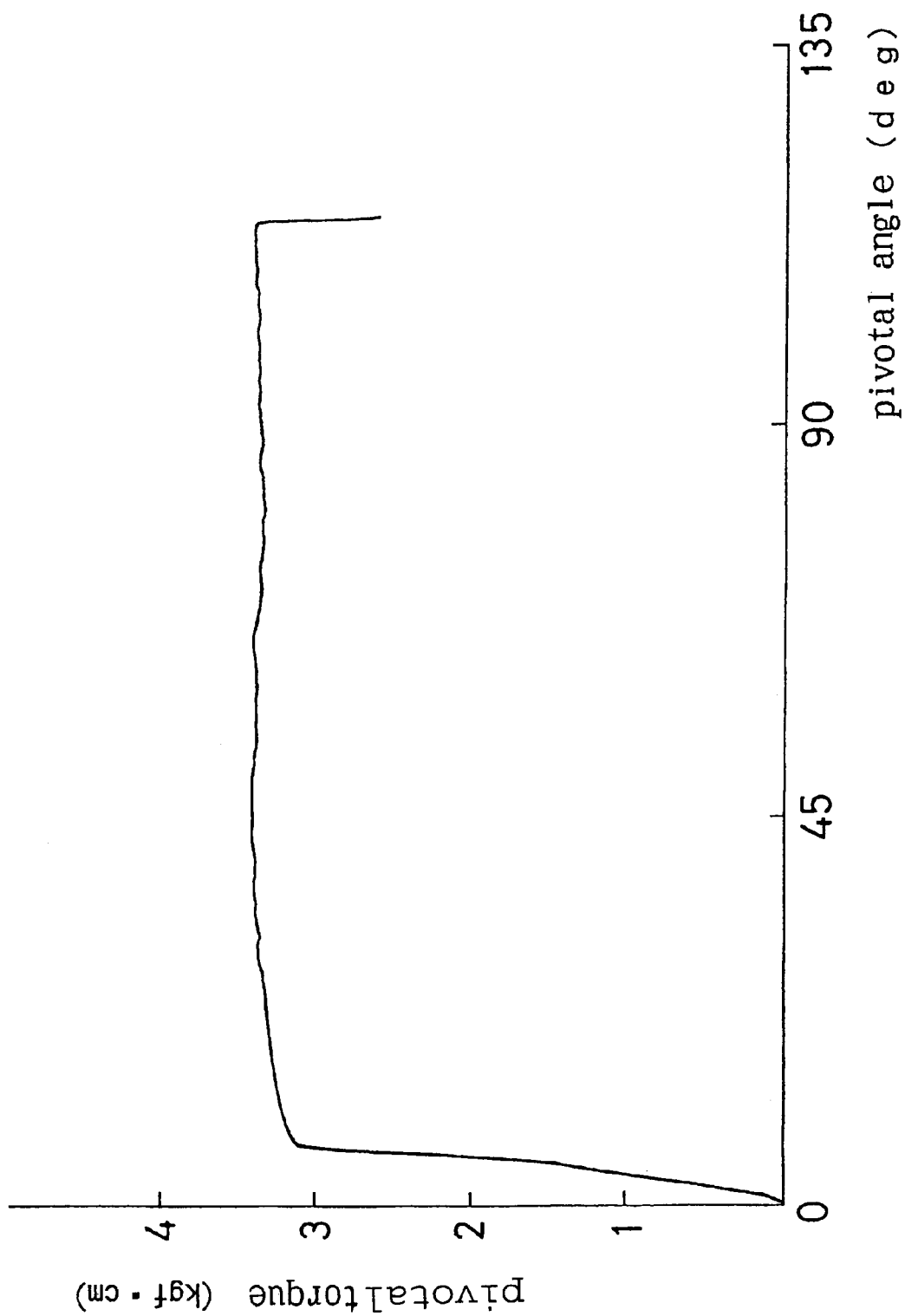
FIG. 13 is a characteristics showing a relationship between the pivotal angle and torque according to a second embodiment of the invention when an antifriction medium is added to the synthetic resin of a support member.
Figure 14:
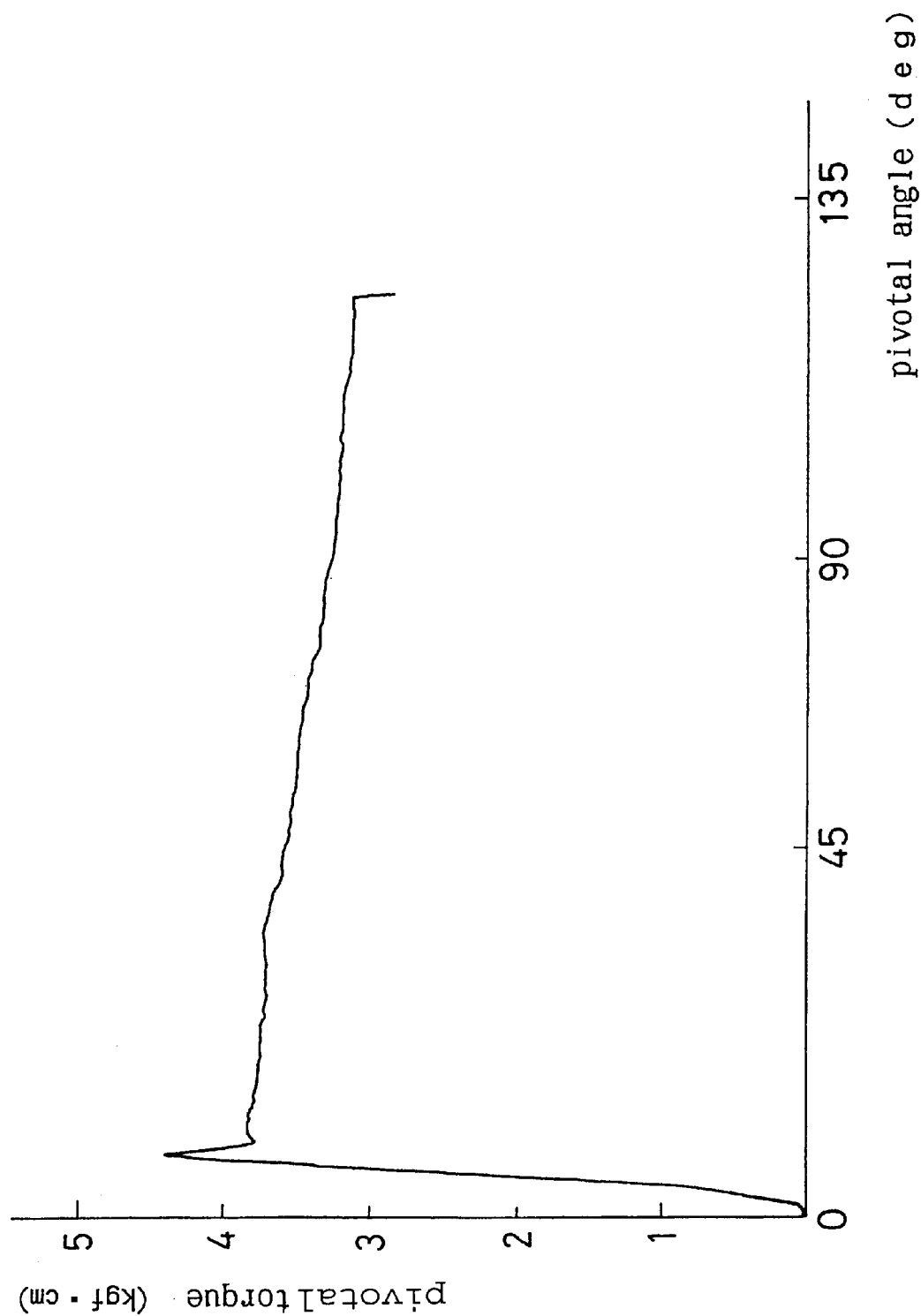
FIG. 14 is a characteristics showing a relationship between the pivotal angle and torque in parallel with FIG. 13 when an antifriction medium is not added to the synthetic resin of the support member.

By comparing FIG. 13 in which PTFE (polytetrafluoroethylene) is added by 3% by weight to the synthetic resin and FIG. 14 in which PTFE is not added, it is readily found that the metallic shaft 10 can pivotally move smoothly from the beginning when PTFE is added. This substantially reduces the wear dust due to the friction between the metallic shaft 10 and the support block 20.

Figure 15:
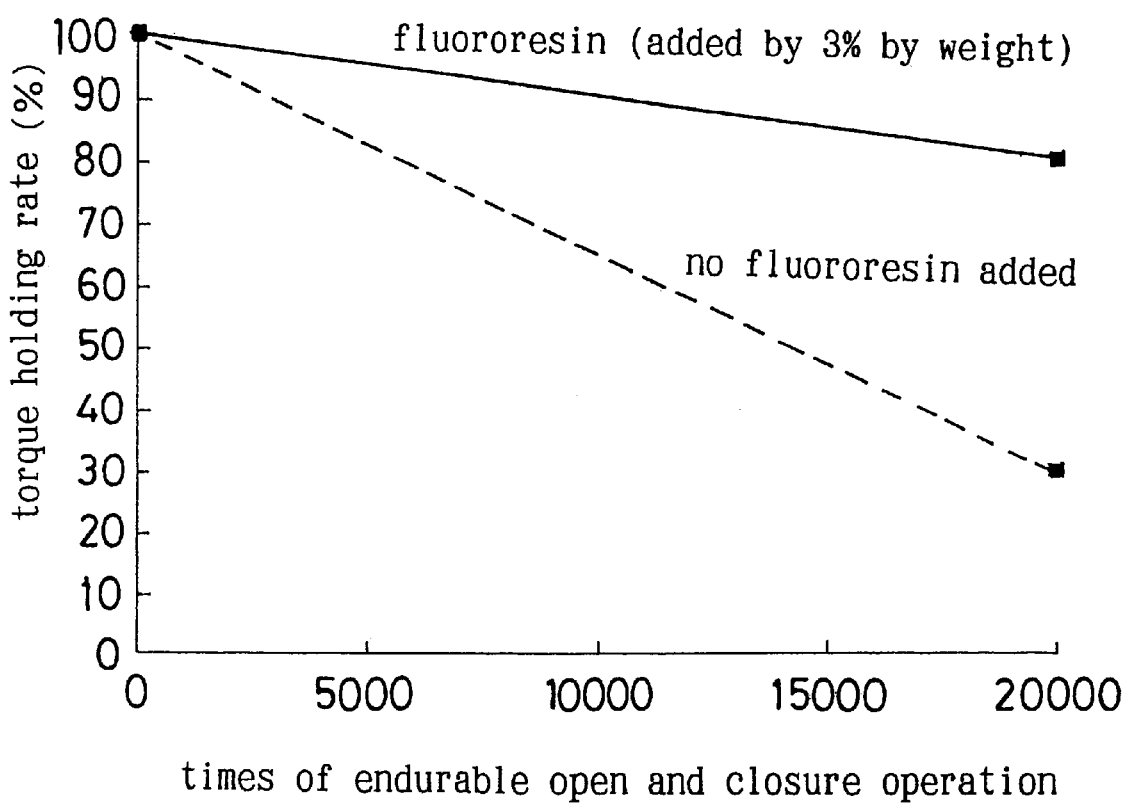
FIG. 15 is a characteristics showing a relationship between an endurance limit and a change of torque to compare when the antifriction medium is added and not added to the synthetic resin of the support member.

FIG. 15 compares the endurance in which the antifriction medium is added and the endurance in which the antifriction medium is not added. When the antifriction medium is added, reduction of the torque holding rate is almost inappreciable, thus leading to a long period of service life.

As a third embodiment of the invention, added to the synthetic resin is mineral, vitreous fiber, carbon fiber or the like at most by 40% by weight so as to impart a sufficient mechanical strength with the support block 20 when forming the support block 20 in integral with the metallic shaft 10.

As understood from the foregoing description, with the support block 20 made of the synthetic resin (at most 30% by weight) molded to surround the metallic shaft 10, the support block 20 tightly engages with the metallic shaft 10 due to the residual stress established by the shrinkage allowance after molding the support block 20 in integral with the metallic shaft 10. With the support block 20 and the metallic shaft 10 molded integrally, it is possible to manufacture them less costly while making it possible to readily determine the surface frictional resistance necessary to suspend the metallic shaft 10 at the desired pivotal position.

With the changing rate of the bending elasticity up to 30% at the operating temperature ranging from −20 to 80° C., it is possible to maintain the necessary surface friction against the metallic shaft 10 when the normal ambient temperature fluctuates, thus maintaining a stable surface frictional resistance therebetween for an extended period of time. It is also possible to exceedingly reduce the wear dust produced between the support block 20 and the metallic shaft 10 to maintain a stable surface frictional resistance therebetween for an extended period of time.

As opposed to the case in which greasing agent is applied between the support block 20 and the metallic shaft 10, it is possible to prevent the perimeter from being inadvertently polluted because the support block 20 and the metallic shaft 10 acts as a friction damper.

Upon opening and closing the lid plate, it is possible to frictionally hold the lid plate 30 at the desired pivotal angle with the stable friction under different circumstances. This makes various types of lid plates in the business devices more user-friendly.

It is to be noted that the surface treatment may be directly provided with the metallic shaft 10 by means of e.g., rolling procedure at a surface treatment step when determining the surface roughness (Ra) to be 0.15~0.35 $\mu$m.

It is to be observed that instead of the lid plate of the note type personal computer, the frictional hinge device may be applied to a lid plate of a copy machine, porcelain toilet, automobile hatch, hood or the like.

While there has been described what is at present thought to be preferred embodiments of the invention, it will be understood that modifications may be made therein and it is intended to cover in the appended claims all such modifications which fall within the scope of the invention.

What is claimed is:

1. A frictional hinge device comprising:
   a metallic shaft member having a rotational axis as a rotational center;
   a support member which rotationally supports said rotational axis at said metallic shaft member;
   said support member being made of a synthetic resin formed around said rotational axis integrally so that said rotational axis can rotate with a surface frictional resistance between said support member and said rotational axis due to a shrinkage allowance when forming said synthetic resin between said support member and said rotational axis; and
   said synthetic resin having a bending elasticity, a changing rate of which is up to 30% at an operating temperature ranging from −20 to 80° C.

2. The frictional hinge device as set forth in claim 1, wherein said synthetic resin forming said support member is selected from the group consisting of an amorphous resin or crystallized resin which loses less physical properties when crystallized.

3. The frictional hinge device as set forth in claim 2, wherein said amorphous resin is selected from the group consisting of PS (polystyrene), PMMA (polymethyl methacrylate), PPE (polyephenylene ether), PC (polycarbonate), PAR (polyarylate), PAI (polyamide imide), PES (polyether sulfone), PSF (polysulfone) and PEI (polyether imide).

4. The frictional hinge device as set forth in claim 2, wherein said crystallized resin is selected from the group consisting of PPS (polyphenylene sulphide), PEEK (polyether ether ketone), aromatic PA (aromatic Polyamide), PMP (polymethylpentene) and PEK (polyether ketone).

5. The frictional hinge device as set forth in claim 1 wherein said sysnthetic resin is mixed with an antifriction medium when molding said support member around said shaft member.

6. The frictional hinge device as set forth in claim 5, wherein said antifriction medium includes an organic component selected from the group consisting of fluoro-based resin, olefine-based resin, whale oil, carbon fiber and graphite.

7. The frictional hinge device as set forth in claim 5, wherein said antifriction medium includes an inorganic component selected from the group consisting of molybdate bisulfide, antimonate oxide, potassium titanate, talc, vitreous particulate, metallic soap and kaolin clay.

8. The frictional hinge device as set forth in claim 1, wherein mineral, vitreous fiber, or carbon fiber is added to said synthetic resin to improve its mechanical strength when molding said support member around said shaft member.

9. A portable business device in which the frictional hinge device as set forth in claim 1 is used to pivotably move a display thereof.

10. The frictional hinge device as set forth in claim 2 wherein said synthetic resin is mixed with an antifriction medium when molding said support member around said shaft member.

11. A frictional hinge device comprising:

a metallic shaft member having a rotational axis as a rotational center;

a support member which rotationally supports said metallic shaft member on said rotational axis;

said support member being relatively rotable in relation with said metallic shaft member, and held at an angle by surface friction resistance between said support member and said metallic shaft member;

said support member being molded as a synthetic resin around said metallic shaft member when a powdered synthetic resin is injected into a mold, so as to establish said surface resistance between said support member and said metallic shaft member due to a residual stress shrinkage appearing therebetween when cooling said synthetic resin to shrink; and said synthetic resin having a bending elasticity with a changing rate up to 30% at an operating temperature ranging from −20 to 80° C.

* * * * *